Dec. 14, 1937.                R. C. WAPPNER                2,102,172

THERMOMETER

Filed Nov. 13, 1936

INVENTOR
Ralph C. Wappner
BY Staley + Welch
ATTORNEYS

Patented Dec. 14, 1937

2,102,172

UNITED STATES PATENT OFFICE 2,102,172

THERMOMETER

Ralph C. Wappner, Springfield, Ohio

Application November 13, 1936, Serial No. 110,693

3 Claims. (Cl. 73—352)

This invention relates to thermometers, it more particularly relating to a thermometer of the type which is used for determining the temperature of commodities which are being cooked, such for instance as a meat roast or a cake.

The object of the invention is to provide a thermometer of this character which will be simple in construction, economical in manufacture and effective for the purpose for which it is designed.

Figure 1:
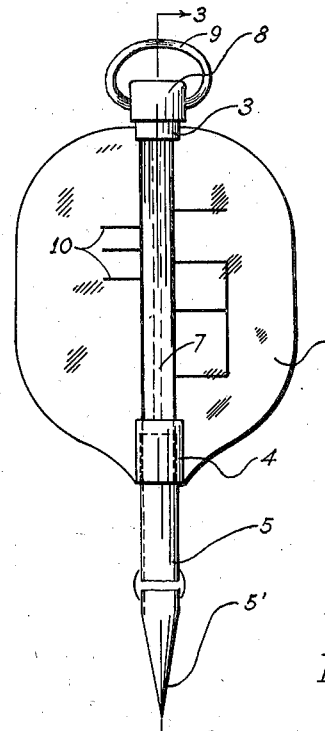
Fig. 1 is a front elevation of a thermometer embodying the improvements.
Figure 2:
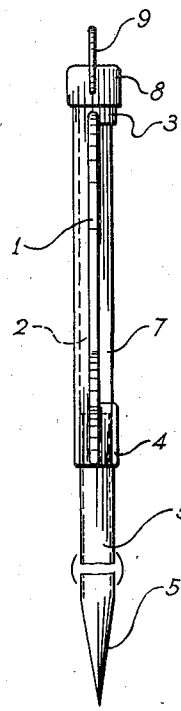
Fig. 2 is a side elevation of the same.
Figure 3:
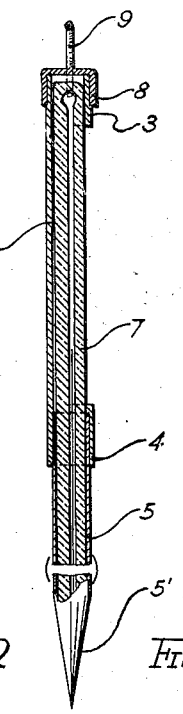
Fig. 3 is a vertical section on the line 3—3 of Fig. 1.
Figure 4:
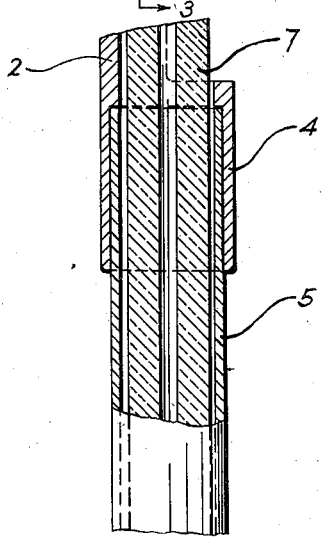
Fig. 4 is an enlarged vertical section of a portion of the device, the section being on part of the line 3—3 of Fig. 1.
Figure 5:
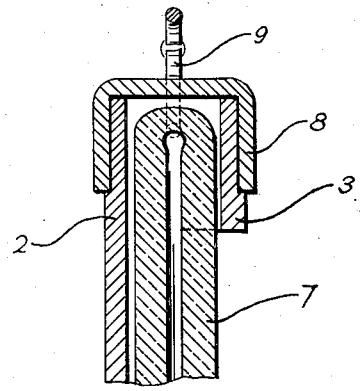
Fig. 5 is also an enlarged vertical section of another portion of the device, the section being on part of the line 3—3 of Fig. 1.

Referring to the drawing, 1 represents a flat head which has a vertically-extending channel 2, open on its forward side. At the upper end of the head is an integral hollow boss 3, the bore of which communicates with the channel 2. At the lower end of the head is an integral sleeve 4, the bore of which also communicates with the channel 2.

Secured in the sleeve 4 is an elongated tubular casing 5 the lower end of which is pointed as indicated at 5'. The upper end of this tubular casing 5 is secured in the bore of the sleeve 4 with a tight drive fit.

In assembling the device, after the casing 5 has been secured in position the thermometer tube 7 is inserted through the bore of the boss 3, thence through the channel 2 and thence into the tubular casing 5, the bulb of the tube being located in the lower portion of the casing. A cap 8 is then driven with a tight fit upon the exterior of the boss 3, this cap having secured thereto in any suitable way a ring 9 to facilitate the handling of the device.

In the use of the thermometer the sharp pointed end 5' of the casing permits it to be inserted in the meat roast, cake, or other commodity which is being cooked. The upper portion of the thermometer tube is exposed as shown and the head 1 may be provided with any suitable indications to indicate the proper temperature. Preferably these indications are in the form of indications such as the ones shown in Fig. 1 to indicate the proper temperature that the interior of the commodity being cooked should have, such indications being indicated at 10.

The indications are ones which have been graduated for different kinds of roast meat. For instance, on the left hand side the top indication is for lamb, the lower one for cured pork, and the intermediate one for veal. On the right hand side the top indication is for fresh pork and the two lower zones are for beef, the upper zone being for well done, the center indication for medium and the lower zone for rare. The indications will be so marked but these markings have not been shown in the drawing.

Having thus described my invention, I claim:

1. In a thermometer, an enlarged head having a bore at its lower end and a hollow boss at its upper end, a closed elongated casing for a thermometer tube secured in said bore with a tight drive fit, said head having a vertical open-front channel which communicates with said bore and also with the bore in said boss, a thermometer tube located in said channel and said casing and exposed through the open front of said channel, and a cap fitted to said boss with a tight drive fit.

2. In a thermometer, a substantially flat enlarged head having a vertically extending open-front channel, a hollow sleeve at the lower end of said head communicating with said channel, a hollow boss at the upper end of said head also communicating with said channel, a tubular elongated closed casing secured in the bore of said sleeve with a tight drive fit, a thermometer tube located in said channel and said casing, said head extending laterally of said channel to provide spaces for temperature indicia, and a cap secured to the exterior of said bore with a tight drive fit.

3. In a thermometer, an enlarged laterally extending head having an integral bore at its lower end and an integral hollow boss at its upper end, an elongated closed casing for a thermometer tube secured in said bore with a tight drive fit, said head having a vertical open-front channel which communicates with said bore and also with the bore in said boss, a thermometer tube located in said boss, channel and casing, and a cap fitted to said boss with a tight drive fit, said casing having a sharp pointed lower end.

RALPH C. WAPPNER.